United States Patent
Smith et al.

(10) Patent No.: US 6,895,542 B2
(45) Date of Patent: May 17, 2005

(54) DATA RECOVERY CIRCUIT AND METHOD AND DATA RECEIVING SYSTEM USING THE SAME

(75) Inventors: Sterling Smith, HsinChu Hsien (TW); Huimin Tsai, Hsinchu (TW); Sheng-Yao Liu, Taipei Hsien (TW)

(73) Assignee: MStar Semiconductor, Inc. (TW)

( * ) Notice: Subject to any disclaimer, the term of this patent is extended or adjusted under 35 U.S.C. 154(b) by 21 days.

(21) Appl. No.: 10/699,649

(22) Filed: Nov. 4, 2003

(65) Prior Publication Data

US 2004/0153936 A1 Aug. 5, 2004

Related U.S. Application Data

(60) Provisional application No. 60/423,390, filed on Nov. 4, 2002.

(51) Int. Cl.[7] ............................................. G06F 11/00
(52) U.S. Cl. ................ 714/746; 714/727; 714/798; 714/2; 326/16; 326/37
(58) Field of Search .................. 326/37, 16; 714/746, 714/4, 22, 15, 727, 758, 798; 327/165, 166, 141, 144, 150, 154

(56) References Cited

U.S. PATENT DOCUMENTS 5,864,250 A * 1/1999 Deng ........................ 327/165
5,920,897 A * 7/1999 Jin et al. .................... 711/167
6,545,507 B1 * 4/2003 Goller ........................ 326/93

* cited by examiner

Primary Examiner—Vibol Tan
(74) Attorney, Agent, or Firm—Michael Bednarek; Pillsbury Winthrop Shaw Pittman LLP (57) ABSTRACT

A data recovery circuit for use in a data receiving system to recover an m-bit data stream from an n-bit data stream. The data recovery circuit comprises an n-bit data reconstruction circuit for selecting a data boundary in response to a boundary selection signal and producing a reconstructed n-bit data stream based on the boundary data, a FIFO buffer circuit for temporarily storing the reconstructed n-bit data stream and reading out the m-bit data stream, and a detection circuit for detecting whether the m-bit data stream from the FIFO buffer circuit conforms to a predetermined format and thereby producing a boundary selection signal for controlling the data boundary selection of the n-bit data reconstruction circuit.

12 Claims, 10 Drawing Sheets

| Boundary Selection Candidates | Output | | | | | | | | | | | | | | | |
|---|---|---|---|---|---|---|---|---|---|---|---|---|---|---|---|---|
| | A | | | | | | | | B | | | | | | | |
| | a0 | a1 | a2 | a3 | a4 | a5 | a6 | a7 | b0 | b1 | b2 | b3 | b4 | b5 | b6 | b7 |
| 1 | x0 | x1 | x2 | x3 | x4 | x5 | x6 | x7 | y0 | y1 | y2 | y3 | y4 | y5 | y6 | y7 |
| 2 | x1 | x2 | x3 | x4 | x5 | x6 | x7 | y0 | y1 | y2 | y3 | y4 | y5 | y6 | y7 | x0 |
| 3 | x2 | x3 | x4 | x5 | x6 | x7 | y0 | y1 | y2 | y3 | y4 | y5 | y6 | y7 | x0 | x1 |
| 4 | x3 | x4 | x5 | x6 | x7 | y0 | y1 | y2 | y3 | y4 | y5 | y6 | y7 | x0 | x1 | x2 |
| 5 | x4 | x5 | x6 | x7 | y0 | y1 | y2 | y3 | y4 | y5 | y6 | y7 | x0 | x1 | x2 | x3 |
| 6 | x5 | x6 | x7 | y0 | y1 | y2 | y3 | y4 | y5 | y6 | y7 | x0 | x1 | x2 | x3 | x4 |
| 7 | x6 | x7 | y0 | y1 | y2 | y3 | y4 | y5 | y6 | y7 | x0 | x1 | x2 | x3 | x4 | x5 |
| 8 | x7 | y0 | y1 | y2 | y3 | y4 | y5 | y6 | y7 | x0 | x1 | x2 | x3 | x4 | x5 | x6 |
| 9 | y0 | y1 | y2 | y3 | y4 | y5 | y6 | y7 | x0 | x1 | x2 | x3 | x4 | x5 | x6 | x7 |
| 10 | y7_pre | x0 | x1 | x2 | x3 | x4 | x5 | x6 | x7_pre | y0 | y1 | y2 | y3 | y4 | y5 | y6 |

DATA RECOVERY CIRCUIT AND METHOD AND DATA RECEIVING SYSTEM USING THE SAME

CROSS-REFERENCE TO RELATED APPLICATIONS

This application is based upon and claims the benefit of U.S. provisional application No. 60/423,390 filed Nov. 4, 2002, the contents of which are incorporated herein by reference.

BACKGROUND OF THE INVENTION

1. Field of the Invention

The present invention relates to a data recovery circuit, and more particularly, to a data recovery circuit for use in a high-frequency DVI receiving system.

2. Description of the Related Art

DVI (Digital Visual Interface) is a digital display interface standard established by several PC and graphic card manufacturers. Thanks to the high speed and the excellent display quality of the DVI transmission system, it is foreseeable that DVI interface will become a widely used standard interface for image display in the near future.

In a data transmission structure of a display system configured with DVI standard, three 8-bit digital image signals respectively for the three primary colors of red, green and blue generated by a graphic card in a computer host are sent to a DVI encoder for encoding into 10-bit DVI image signals. Subsequently, these 10-bit DVI image signals are converted by a DVI transmitter into differential serial image signals and transmitted by a DVI transmission cable to a DVI receiver in a display device.

In a known DVI receiver, the received differential serial image signals are sent to a 1:2 demultiplexer for performing a serial-to-parallel conversion to generate 2-bit parallel signals for subsequent data recovery process. Then, 10-bit DVI image signals are recovered from the 2-bit parallel signals and thereafter decoded by a DVI decoder into 8-bit digital image signals to be displayed on a display panel.

However, according to the DVI standard, the data transmission is implemented though an extremely high frequency. For example, the differential serial image signal is transmitted at a rate of 1.6 GHz, and thus the 2-bit parallel signal converted from the differential serial image signal is transmitted at 800 MHz, which is still high. Since it is difficult to generate a clock signal with such a high frequency and is very complicated to process a high-frequency data signal, there is a need to develop a data recovery circuit that is operable at a lower frequency.

SUMMARY OF THE INVENTION

The object of the invention is to provide a data recovery circuit for use in conjunction with a demultiplexer in a DVI receiver, which is allowed to operate at a lower frequency.

In a DVI receiver using the data recovery circuit according to the present invention, the received differential serial image signal is converted by a 1:8 demultiplexer into an 8-bit parallel data stream with a frequency equal to only one-eighth the rate of the received serial signal. Through the data recovery circuit of the invention, a data boundary for a 10-bit DVI image signal can be found in the 8-bit data stream and accordingly the 10-bit DVI image signal can be recovered by reconstructing the 8-bit data stream on the basis of the detected data boundary.

The data recovery circuit of the invention comprises: an 8-bit data reconstruction circuit receiving the 8-bit data stream, the 8-bit data reconstruction circuit selecting a data boundary from a plurality of boundary selection candidates in response to a boundary selection signal and producing a reconstructed 8-bit data stream based on the data boundary; a FIFO buffer circuit coupled to an output of the 8-bit data reconstruction circuit, the FIFO buffer circuit including a register and a write and read control circuit for controlling an 8-bit write operation and a 10-bit read operation of the register to receive the reconstructed 8-bit data stream and produce the 10-bit data stream; and a decoder coupled to an output of the FIFO buffer circuit, the decoder including a detection circuit for detecting whether or not the 10-bit data stream conforms to a predetermined format, and accordingly producing the boundary selection signal, the decoder decoding the 10-bit data stream for output upon the detection circuit detects a conformity between the 10-bit data stream and the predetermined format.

BRIEF DESCRIPTION OF THE DRAWINGS

Objects and advantages of the present invention will be fully understood from the detailed description to follow taken in conjunction with the embodiments as illustrated in the accompanying drawings, wherein.

DETAILED DESCRIPTION OF THE PREFERRED EMBODIMENT

Figure 1:
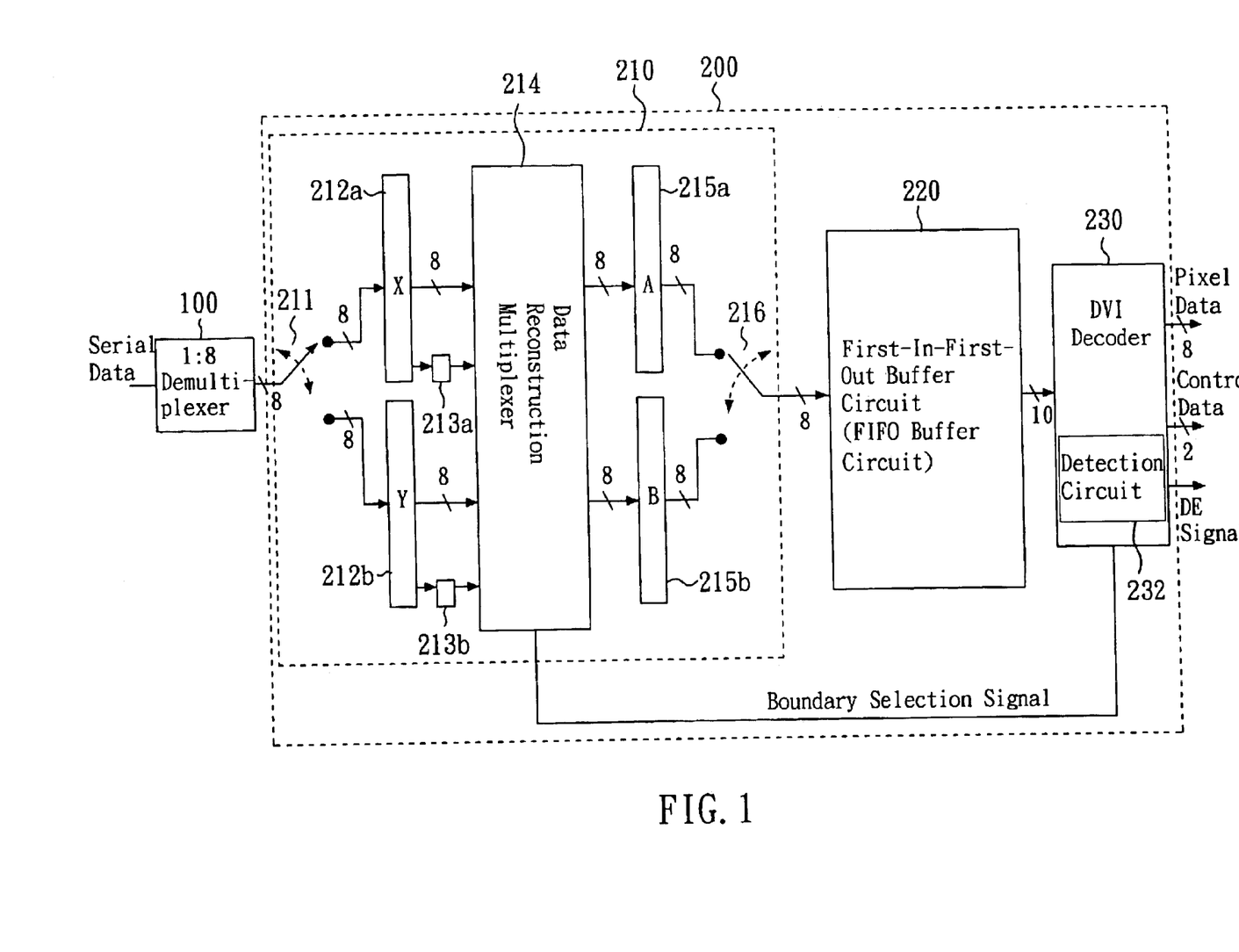
FIG. 1 depicts a schematic block diagram of the data recovery circuit for use in a DVI receiver according to the present invention.

Referring to FIG. 1, according to the present invention, a differential serial image signal received by a DVI receiver is converted by a 1:8 demultiplexer 100 into an 8-bit data stream. Therefore, if the differential serial image signal is transmitted at a rate of X Hz, then the frequency of the 8-bit parallel data stream from the 1:8 demultiplexer 100 is X/8 Hz. In the case that the differential serial image signal runs at 1.6 GHz, the data rate at the output of the 1:8 demultiplexer 100 is only 200 MHz. The thus generated 8-bit data stream should be converted into a 10-bit DVI data stream by a data recovery circuit 200 before being decoded according to the DVI standard to obtain image data for display on a panel. However, it is not necessary that the first bit of the 8-bit parallel data received by the data recovery circuit 200 is the first bit of a 10-bit DVI data. Consequently, in the invention, the data recovery circuit 200 operates to locate a correct boundary of the 10-bit DVI data in the 8-bit data stream from the 1:8 demultiplexer 100, and, based on the correct boundary, a 10-bit data stream can be properly recovered and then be decoded into an 8-bit digital image signal according to the DVI standard.

Please note that although the data recovery circuit of the preferred embodiment disclosed herein is operable for recovering a 10-bit data stream from an 8-bit data stream, it should be considered as illustrative and not restrictive. The data recovery circuit of the invention may be used in any applications for recovering an m-bit data stream from an n-bit data stream, wherein n and m are different integers greater than 2 and typically n is a power of 2 while m is often not a power of 2.

As shown in FIG. 1, the data recovery circuit 200 of the invention mainly comprises an 8-bit data reconstruction circuit 210, a first-in first-out (FIFO) buffer circuit 220 and a DVI decoder 230. The 8-bit data reconstruction circuit 210 operates to select a boundary for the received 8-bit data stream in response to a boundary selection signal, and reconstruct the 8-bit data by rearranging the bits in a new order decided by the newly selected boundary. Next, the reconstructed data from the 8-bit data reconstruction circuit 210 is sent to the FIFO buffer circuit 220 for temporarily storage. Then, the data in the FIFO buffer circuit 220 can be read out in a 10-bit format to the DVI decoder 230. A detection circuit 232 provided in the DVI decoder 230 operates to detect whether or not the 10-bit data from the FIFO buffer circuit 220 is a correct DVI data to thereby determine whether or not the boundary selected by the 8-bit data reconstruction circuit 210 is a correct boundary. According to the detection result, the detection circuit 232 produces the boundary selection signal, indicating the 8-bit data reconstruction circuit 210 to hold the currently selected boundary or to select a new boundary.

The detailed detection scheme of the detection circuit 232 is explained as follows. According to the DVI standard, two kinds of data, i.e., the pixel data and the control data, are transmitted and received in a DVI display system. The pixel data, which is transmitted during the active data period, contains the image data of one pixel to be displayed on the display panel. The active data period is followed by a blank period, during which the control data containing a control message is transmitted. The control message is not normally displayed on the display panel. The pixel data and the control data conform to specific rules. As a pixel data, a 10-bit DVI signal represents five or fewer transitions, while, as a control data, a 10-bit DVI signal represents seven or more transitions. Furthermore, there are four distinct values for the control data, which are (1101010100), (0010101011), (0101010100) and (1010101011), i.e., the hexadecimal values 354, 0ab, 154 and 2ab. By taking advantage of this, the detection circuit 232 may detect whether the data conforming to the specific format of the control data is present or absent in the 10-bit data stream from the FIFO buffer circuit 220, so as to determine whether or not the currently selected boundary is at the correct location. In other words, if the detection circuit 232 fails to detect the presence of a succession of the unique hexadecimal values 354, 0ab, 154 and 2ab, it will issue a boundary selection signal indicating the 8-bit data reconstruction circuit 210 to select a new boundary. When the detection circuit 232 detects the presence of a succession of the unique hexadecimal values 354, 0ab, 154 and 2ab, it will issue a boundary selection signal indicating the 8-bit data reconstruction circuit 210 to hold the currently selected boundary.

Once the correct location of the boundary is determined and the 10-bit data is recovered, the DVI decoder 230 may begin to decode the recovered 10-bit data for output, wherein the 10-bit pixel data is decoded into an 8-bit pixel data while the 10-bit control data is decoded into a 2-bit control data. In addition, the DVI decoder 230 also outputs a DE signal, which is a 1-bit data enable signal having a content of "1" during the active data period or "0" otherwise.

Figure 2:
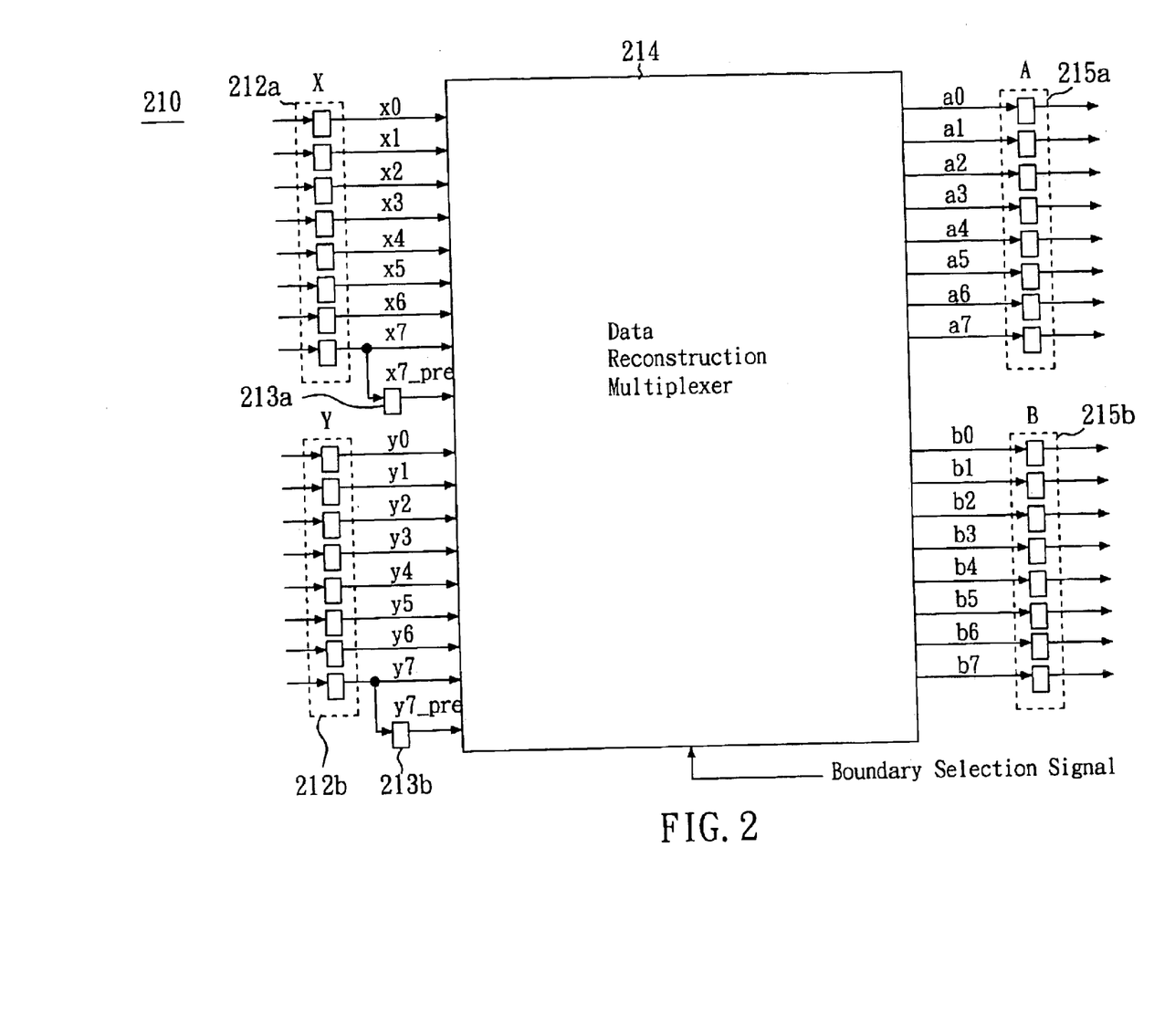
FIG. 2 depicts a detailed structure of an 8-bit data reconstruction circuit.

The 8-bit data reconstruction circuit 210 mainly comprises a data reconstruction multiplexer 214 for controlling the boundary selection and the data reconstruction. Two 8-bit registers 212a and 212b, two 1-bit registers 213a and 213b and a switch 211 are provided on the input side of the 8-bit data reconstruction circuit 210. The switch 211 is controlled by the decoder 230 to switch at a rate of X/8 Hz to thereby connecting the output data from the 1:8 demultiplexer 100 alternatively to the register 212a or to the register 212b. The register 213a and 213b are respectively employed to latch the most significant bits of the data in the registers 212a and 212b for one cycle. Two 8-bit registers 215a and 215b and a switch 216 are provided on the output side of the data reconstruction multiplexer 214. The switch 216 is also controlled by the decoder 230 to switch at the rate of X/8 Hz to thereby alternatively output the data from the register 215a or from the register 215b to the FIFO buffer circuit 220.

Figure 3:
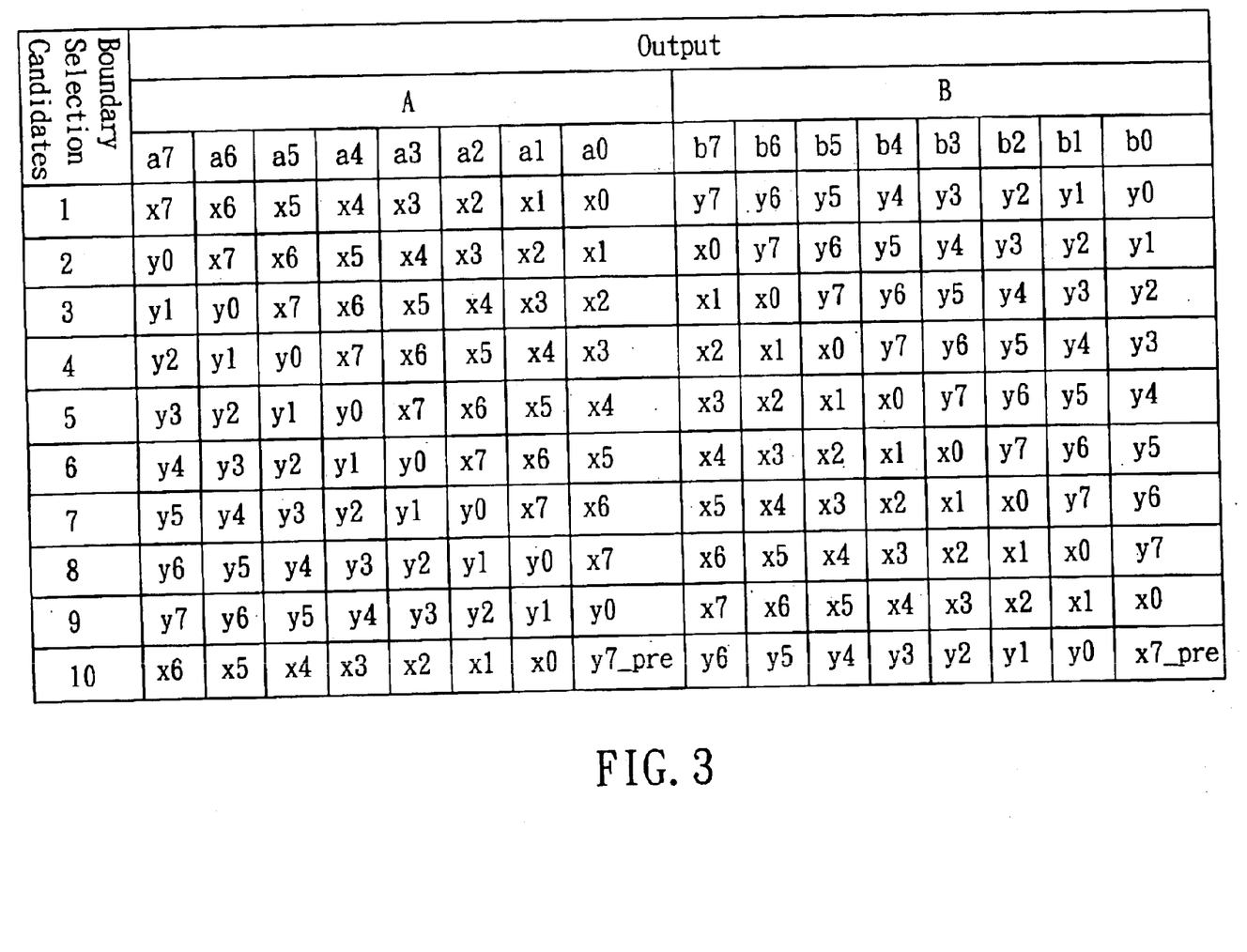
FIG. 3 is a table listing the boundary selection candidates and the corresponding outputs.

Referring to FIGS. 2 and 3, the data reconstruction multiplexer 214 is triggered by the boundary selection signal to select a boundary from a plurality of candidates and operates to select a plurality of reconstructed data bits from the 18 data bits including the 8-bit data x0~x7 in the register X 212a, the 1-bit data x7_pre in the register 213a, the 8-bit data y0~y7 in the register Y 212b and the 1-bit data y7_pre in the register 213b. The reconstructed data selection begins at the boundary and is made in a proper order. The selected bits are sent to the register A 215a and the register B 215b for temporarily storage. In this embodiment, there are totally ten boundary selection candidates, which are listed in FIG. 3. Taking example of the third candidate in FIG. 3, the data reconstruction multiplexer 214 first selects the data bits x2~x7, y0 and y1 as output data bits a0~a7 to the register A 215a, and in the next cycle selects the data bits y2~y7, x0 and x1 as output data bits b0~b7 to the register B 215b. If the output reconstructed data of the third candidate fails to result in a correctly recovered 10-bit data stream (as described above), then the detection circuit 232 will produce a boundary selection signal indicating the data reconstruction multiplexer 214 to select a new boundary, for example, the 4th candidate, the 5th candidate, . . . , until a correct 10-bit data stream is recovered from the reconstructed data.

Figure 4:
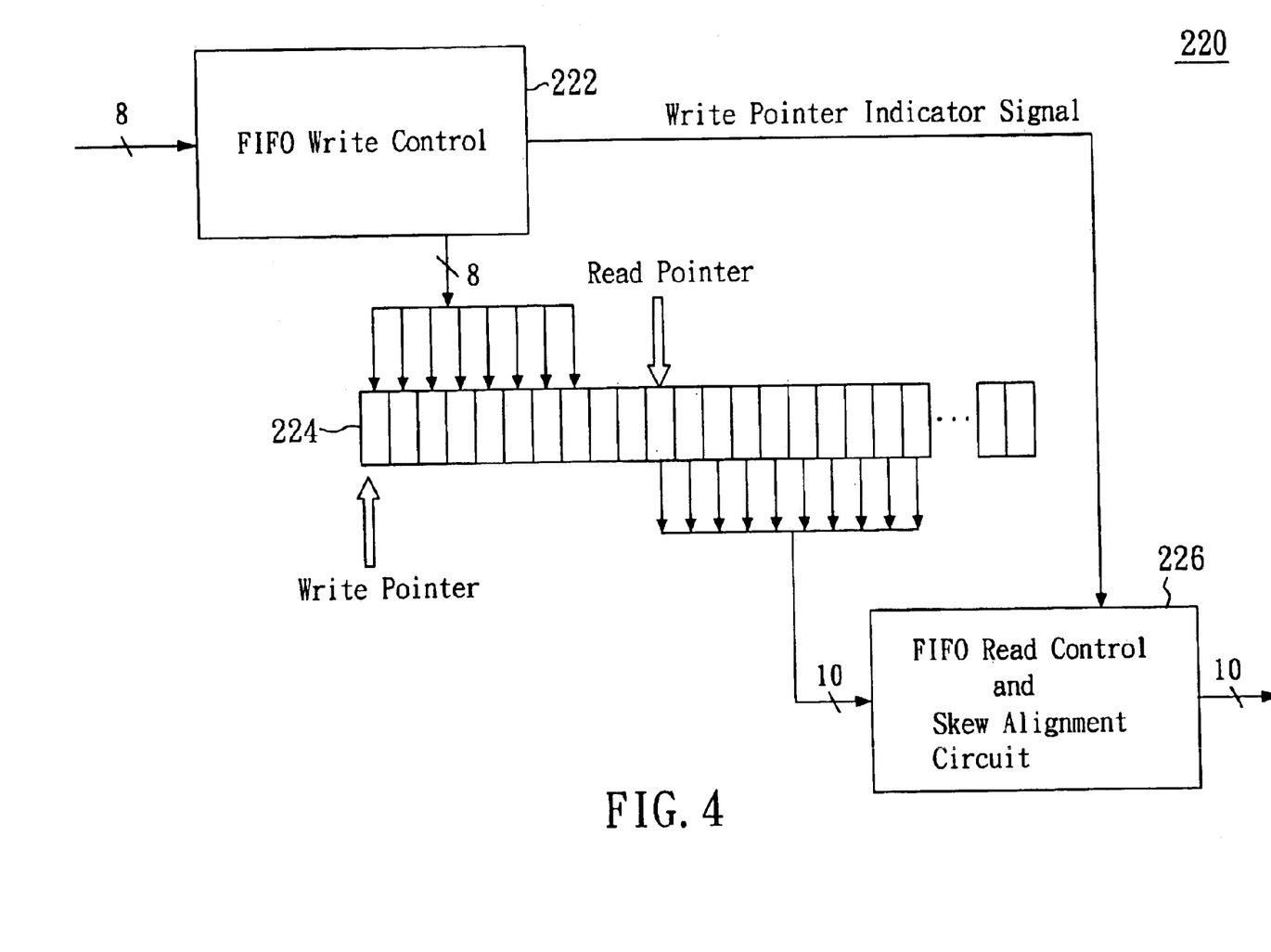
FIG. 4 depicts a schematic block diagram of a FIFO buffer circuit.

FIG. 4 illustrates the detailed structure of the FIFO buffer circuit 220 in FIG. 1. The FIFO buffer circuit 220 is preferably provided with a 40-bit register 224, wherein 40 is the least common multiple of 8 and 10, since the register 224 is written in an 8-bit format from the data reconstruction circuit 210 and read in a 10-bit format to the DVI decoder 230. The register 224 may also have a larger size, preferably with a number of bits being a common multiple of 8 and 10, such as 80 and 120. Alternatively, the register 224 may also be implemented to have a number of bits other than a common multiple of 8 and 10, such as 60, but, in this case, the control of the FIFO buffer circuit is more complicated. The write operation of the register 224 is performed at a rate of X/8 Hz in an 8-bit format, i.e., on a "byte" basis. Totally five bytes can be written into the 40-bit register 224. The read operation of the register 224 is performed at a rate of X/10 Hz in a 10-bit format, i.e., on a "word" basis. Totally four words can be read out from the 40-bit register 224. For the write operation and the read operation to reach a balance without read/write errors, the FIFO buffer circuit 220 is provided with a FIFO write control 222 for controlling the movement of a write pointer and with a FIFO read control and skew alignment circuit 226 for controlling the movement of a read pointer and for aligning the skew of the read pointer based on a write pointer indicator signal generated by the FIFO write control 222.

Figure 5:
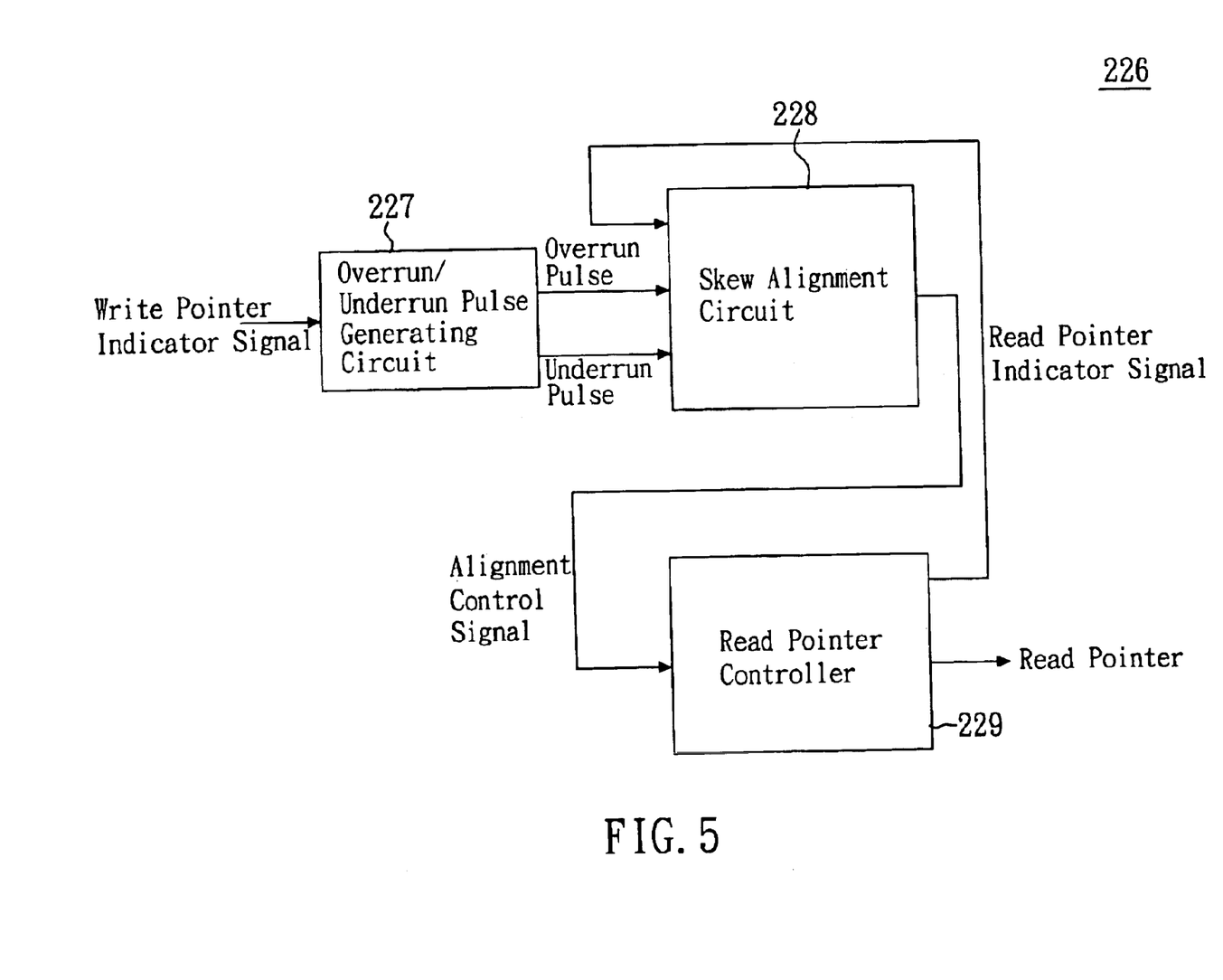
FIG. 5 depicts a schematic block diagram of a FIFO read control and skew alignment circuit.
Figure 6:
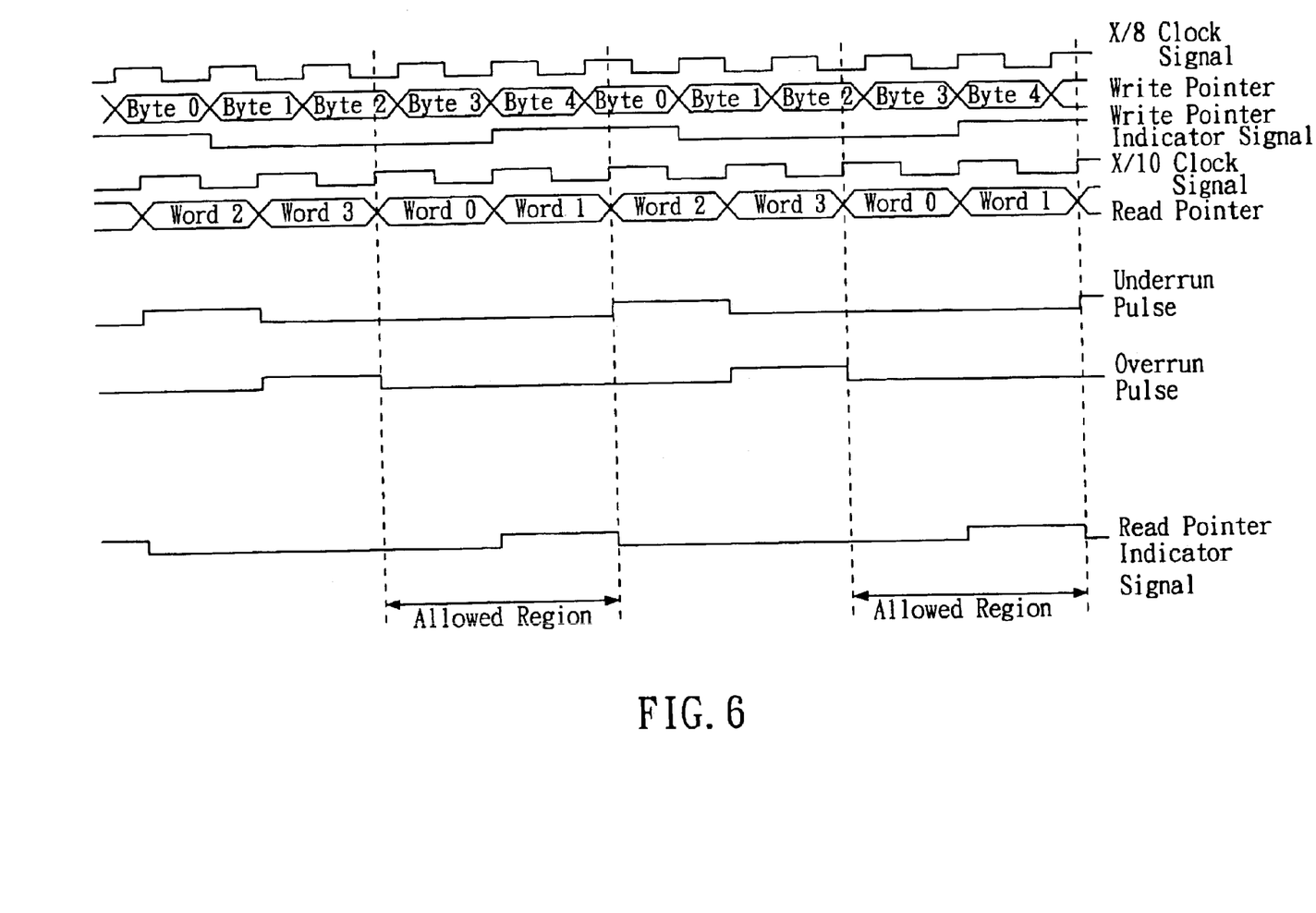
FIG. 6 is a timing diagram of the signals in the FIFO buffer circuit, which illustrates a balance state.
Figure 7:
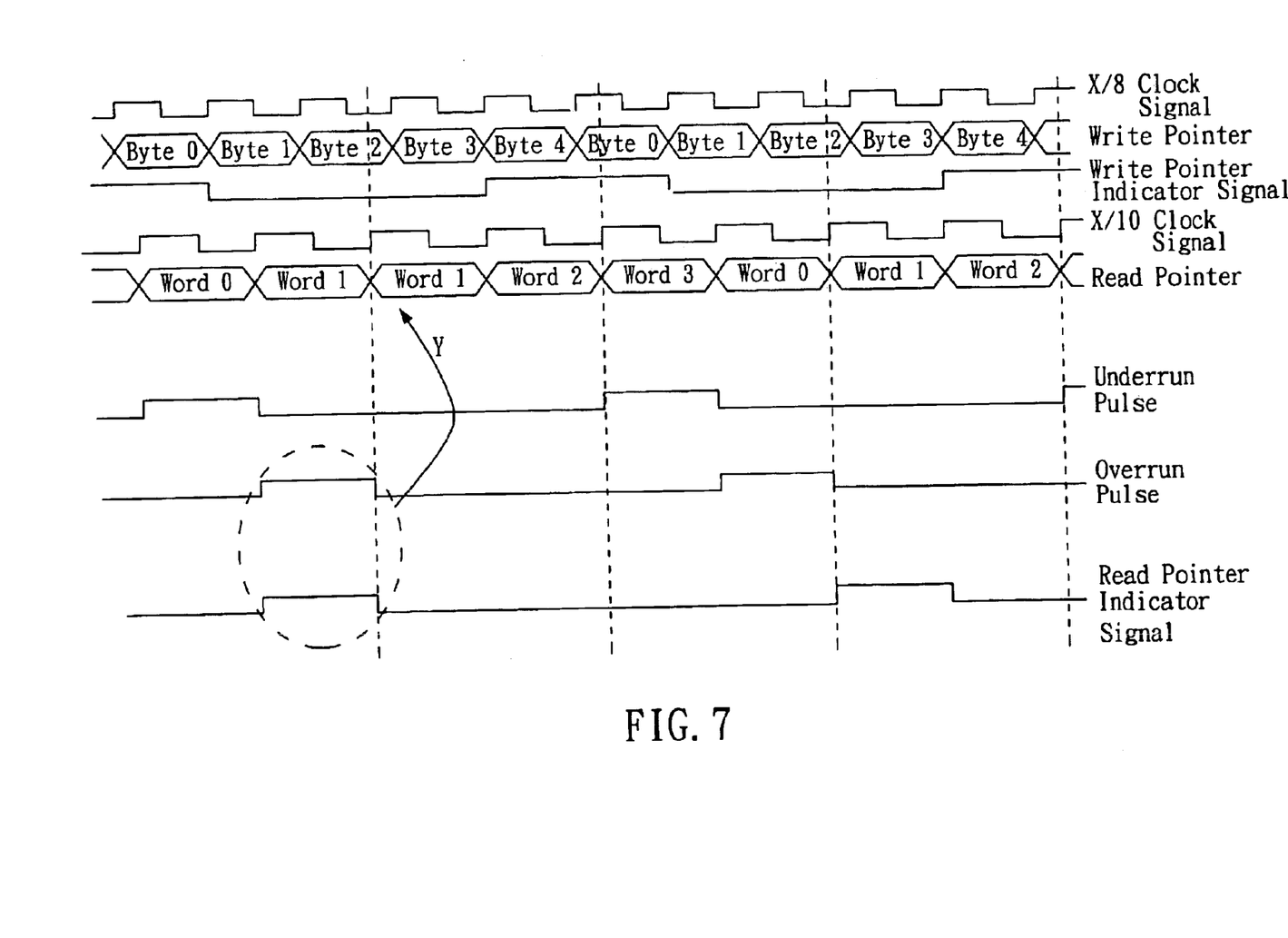
FIG. 7 is a timing diagram of the signals in the FIFO buffer circuit, which illustrates an overrun state.
Figure 8:
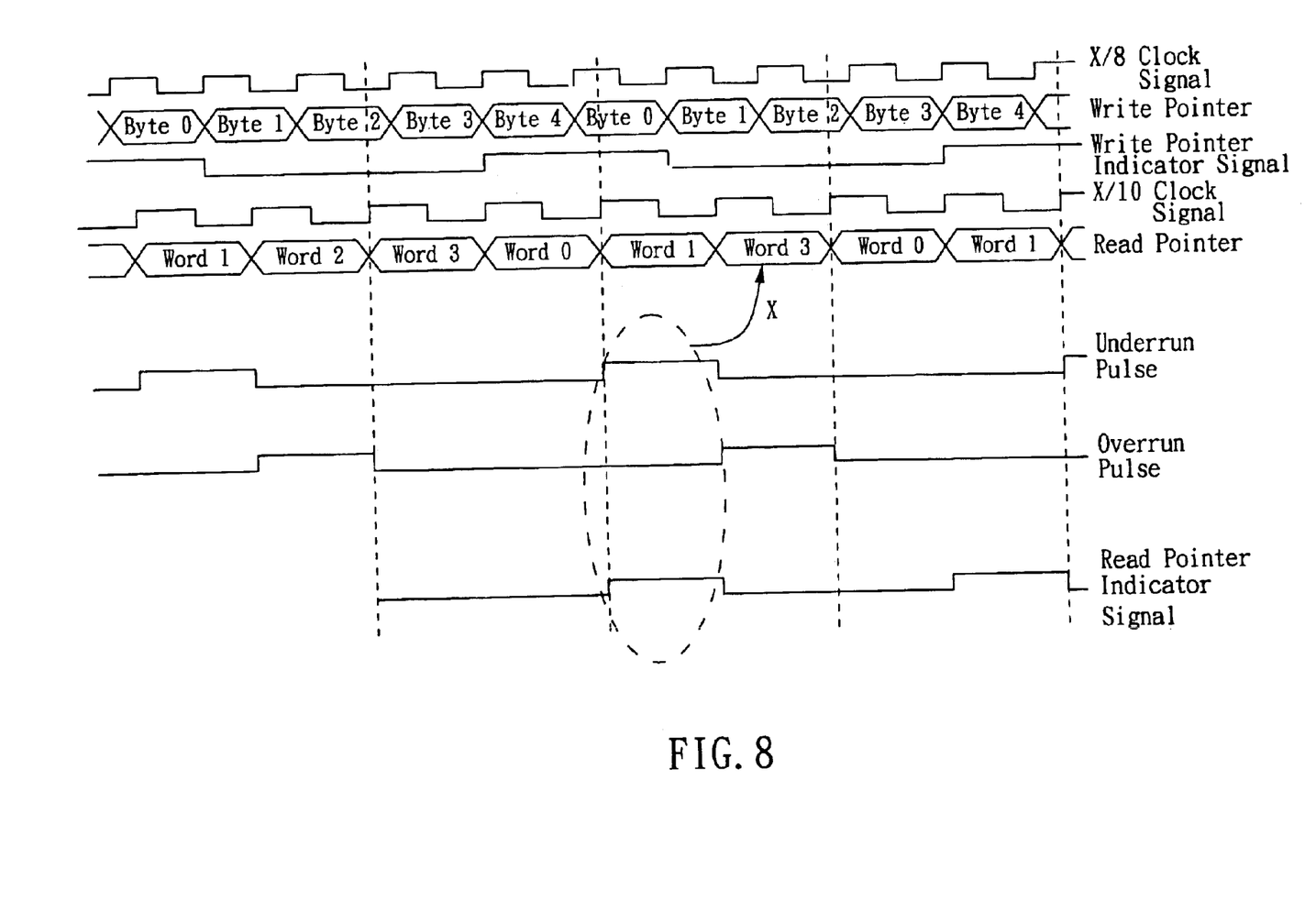
FIG. 8 is a timing diagram of the signals in the FIFO buffer circuit, which illustrates an underrun state.

Please refer to FIGS. 5 to 8. FIG. 5 illustrates a schematic block diagram of the FIFO read control and skew alignment circuit 226, and FIGS. 6 to 8 show the timing diagram of the signals in the FIFO buffer circuit 220. In the FIFO read control and skew alignment circuit 226, an overrun/underrun pulse generating circuit 227 is used to generate an overrun pulse and an underrun pulse by edge detecting based on the write pointer indicator signal, thereby defining a 2-cycle allowed region between the overrun pulse and the underrun pulse. As shown in FIG. 6, when a read pointer indicator signal generated by the read pointer controller 229 falls within the allowed region, it means that the write operation and the read operation can reach a balance. As shown in FIG. 7, when a skew alignment circuit 228 detects an overlap between the read pointer indicator signal and the overrun pulse, it means that the read operation runs too fast. At this time, the skew alignment circuit 228 issues an alignment control signal to the read pointer controller 229, controlling the read pointer to point at the same word, i.e., to repeat the read operation for "Word 1", as indicated by the arrow Y. As shown in FIG. 8, when the skew alignment circuit 228 detects an overlap between the read pointer indicator signal and the underrun pulse, it means that the read operation runs too slow. At this time, the skew alignment circuit 228 issues an alignment control signal to the read pointer controller, controlling the read pointer to skip one word, i.e., to skip the read operation for "Word 2" and jump from "Word 1" directly to "Word 3", as indicated by the arrow X. Thereby, overrun and underrun conditions can be suppressed. The skew alignment operation for the read pointer is preferably carried out during the blank period to avoid deterioration of the display quality.

Figure 9:
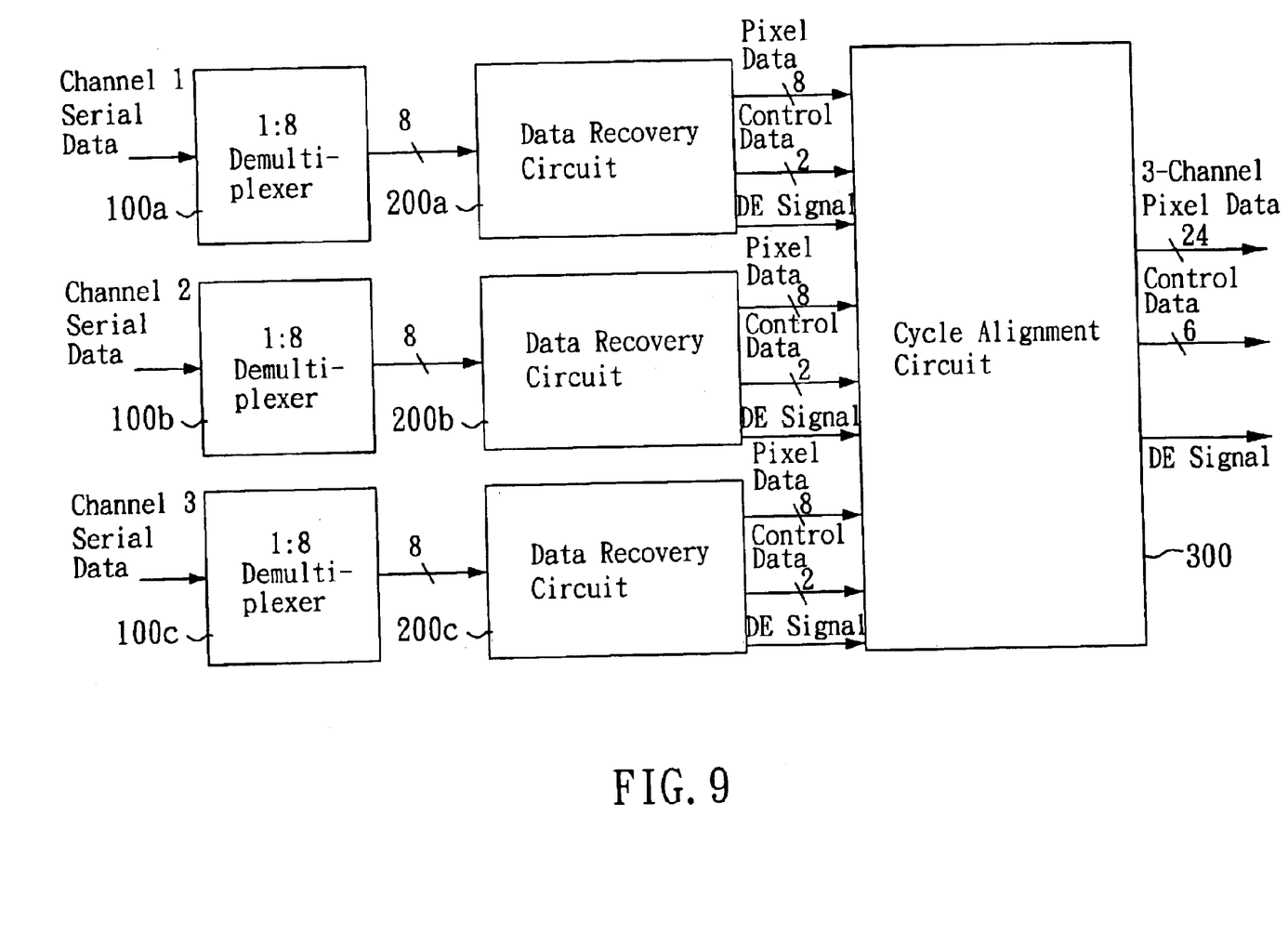
FIG. 9 depicts a schematic block diagram of a 3-channel DVI receiver using the data recovery circuit of the present invention.

In the practical application of a DVI display system, three channels of data respectively for the three primary colors of red, green and blue should be processed separately. FIG. 9 shows a schematic block diagram of a DVI receiver for receiving three data streams. The serial data streams are respectively fed into the 1:8 demultiplexers 100a, 100b and 100c to produce three 8-bit data streams. Then, the data recovery circuits 200a, 200b and 200c respectively operate to recover three 10-bit DVI data streams from the three 8-bit data streams, and performs decoding operations to thereby respectively generate three 8-bit pixel data signals or three 2-bit control data signals and three 1-bit DE signals. A cycle alignment circuit 300 is connected to the output terminals of the data recovery circuit 200a, 200b and 200c to synchronize the three channels of data so that the image data can be properly display on a display panel.

Figure 10:
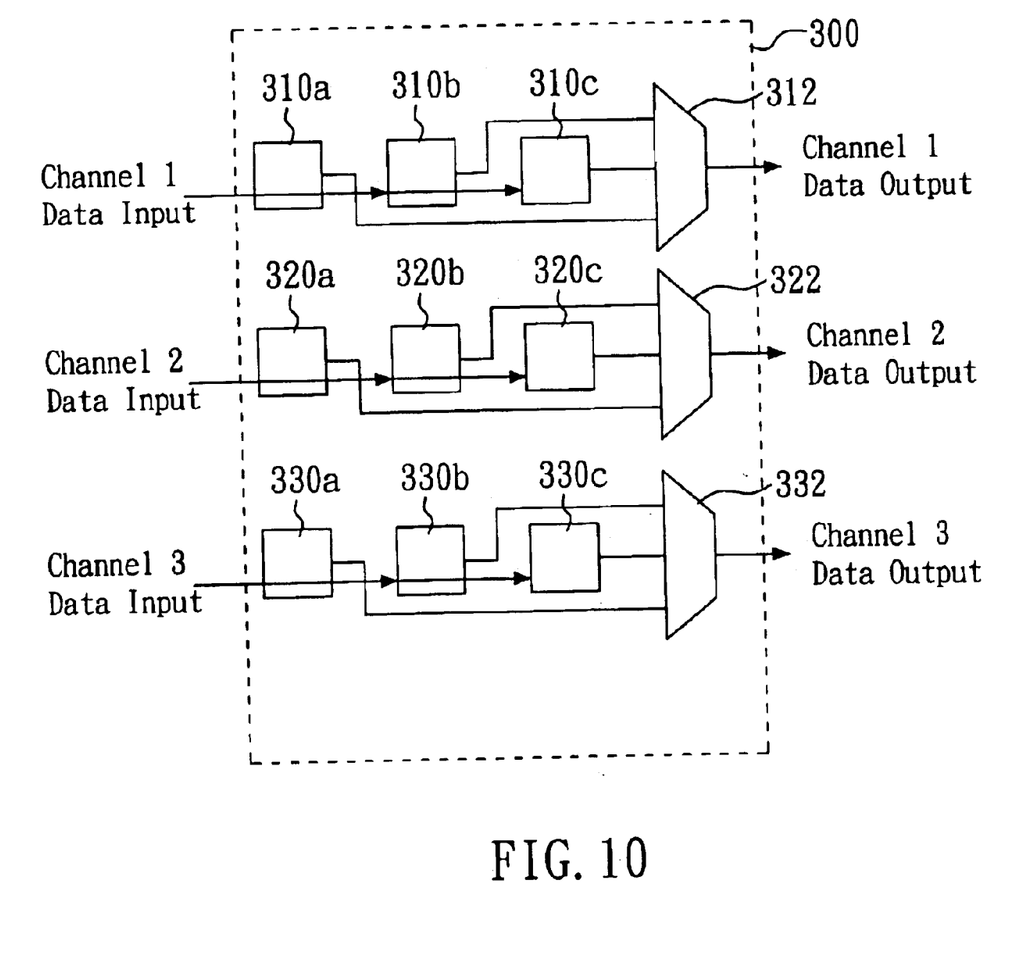
FIG. 10 depicts a schematic block diagram of a cycle alignment circuit.

A schematic block diagram of the cycle alignment circuit 300 is shown in FIG. 10 to comprise a delay line for the first channel consisting of three delay elements 310a, 310b and 310c and a selector 312, a delay line for the second channel consisting of three delay elements 320a, 320b and 320c and a selector 322, and a delay line for the third channel consisting of three delay element 330a, 330b and 330c and a selector 332. The selector 312 is controlled to select one of the three output signals from the three delay elements 310a, 310b and 310c as the aligned output data of the first channel. Similarly, the selector 322 is controlled to select one of the three output signals from the three delay element 320a, 320b and 320c as the aligned output data of the second channel, while the selector 332 is controlled to select one of the three output signals from the three delay elements 330a, 330b and 330c as the aligned output data of the third channel. The alignment of the three 8-bit pixel data signals or the three 2-bit control data signals is achieved by setting one of the three channels as a reference channel and respectively comparing the phase conditions of the other two channels with the phase condition of the reference channel to thereby decide the output signals by controlling the selectors. For example, if the first channel is set as a reference channel, then the selector 312 selects the output signal of the central delay element 310b as the aligned output data of the first channel. If the phase of the second channel data leads the phase of the first channel data, then the selector 322 selects the output signal of the delay element 320c as the aligned output data of the second channel. On the contrary, if the phase of the second channel data lags the phase of the first channel data, then the selector 322 selects the output signal of the delay element 320a as the aligned output data of the second channel. The output data of the third channel may be selected in a similar way. In this case, the phase differences between the three channels of data can be corrected to synchronize the image signals of the three primary colors. As for the alignment of the three DE signals, the DE signal of the reference channel is selected as the aligned DE signal for output. In the above-mentioned example, the DE signal of the first channel is output as the aligned DE signal.

In the embodiment shown in FIG. 10, the delay line for each channel includes three delay elements; however, in order to achieve a cycle alignment for larger skew, more delay elements, such as four or five delay elements, may be provided in each delay line.

While the present invention has been described with reference to the preferred embodiments thereof, it is to be understood that the invention should not be considered as limited thereby. Various modifications and changes could be conceived of by those skilled in the art without departuring from the scope of the present invention, which is indicated by the appended claims.

What is claimed is:

1. A data recovery circuit for recovering an m-bit data stream from an n-bit data stream, said data recovery circuit, comprising:

an n-bit data reconstruction circuit receiving said n-bit data stream, said n-bit data reconstruction circuit selecting a data boundary from a plurality of boundary selection candidates in response to a boundary selection signal and producing a reconstructed n-bit data stream based on said data boundary;

a first-in first-out (FIFO) buffet circuit coupled to an output of said n-bit data reconstruction circuit, said first-in first-out buffer circuit including a register and a write and read control circuit for controlling an n-bit write operation and an m-bit read operation of said register to receiving said reconstructed n-bit data stream and producing said m-bit data stream; and a detection circuit coupled to an output of said FIFO buffer circuit, said detection circuit detecting said m-bit data stream and accordingly producing said boundary selection signal.

2. The data recovery circuit of claim 1, wherein n is a positive integer power of 2.

3. The data recovery circuit of claim 1, wherein n is smaller than m.

4. The data recovery circuit of claim 1, wherein m is not a multiple of n.

5. The data recovery circuit of claim 1, wherein said register having a number of bits equal to the least common multiple of n and m.

6. The data recovery circuit of claim 1, wherein a ratio of a transmission rate of said m-bit data stream to that of said n-bit data stream is n:m.

7. The data recovery circuit of claim 1, wherein said n-bit data reconstruction circuit comprises:
   an input register for temporarily storing data from said n-bit data stream;
   a data reconstruction multiplexer coupled to said input register, said data reconstruction multiplexer selecting said data boundary from said plurality of boundary selection candidates in response to said boundary selection signal and selecting reconstructed data from the data stored in said input register based on said data boundary; and
   an output register coupled to said data reconstruction multiplexer, said output register temporarily storing the reconstructed data selected by said data reconstruction multiplexer and producing said reconstructed n-bit data stream.

8. The data recovery circuit of claim 1, wherein said detection circuit is incorporated in a decoder, which is operable to decode said m-bit data stream for output.

9. The data recovery circuit of claim 1, wherein said write and read control circuit comprises:
   a write controller for controlling the n-bit write operation of said register and producing a write pointer indicator signal; and
   a read controller for controlling the m-bit read operation of said register based on said write pointer indicator signal.

10. A data receiving system, comprising:
    a plurality of data recovery circuits, each for recovering one of a plurality of m-bit data streams from one of a plurality of n-bit data streams and decoding said one of a plurality of m-bit data streams into one of a plurality of decoded data streams, each of said data recovery circuit comprising:
       an n-bit data reconstruction circuit receiving said n-bit data stream, said n-bit data reconstruction circuit selecting a data boundary from a plurality of boundary selection candidates in response to a boundary selection signal and producing a reconstructed n-bit data stream based on said data boundary;
       a first-in first-out (FIFO) buffer circuit coupled to an output of said n-bit data reconstruction circuit, said first-in first-out buffer circuit including a register and a write and read control circuit for controlling an n-bit write operation and an m-bit read operation of said register to receiving said reconstructed n-bit data stream and producing said m-bit data stream; and
       a decoder coupled to an output of said FIFO buffer circuit, said decoder including a detection circuit for detecting said m-bit data stream and accordingly producing said boundary selection signal, said decoder decoding said m-bit data stream into said decoded data stream upon said detection circuit detects a correct condition of said m-bit data stream; and
    a cycle alignment circuit receiving said plurality of decoded data streams from said plurality of data recovery circuits, said cycle alignment circuit aligning phases of said plurality of decoded data streams to synchronize said plurality of decoded data streams.

11. The data receiving system of claim 10, wherein said cycle alignment circuit comprises a plurality of delay lines, each for receiving one of said plurality of decoded data streams, each of said plurality of delay lines including a plurality of delay elements and a selector coupled to outputs of said plurality of delay elements to select one of said outputs of said plurality of delay elements as an aligned output.

12. A data recovery method for recovering an m-bit data stream from an n-bit data stream, said data recovery method comprising the steps of:
    receiving said n-bit data stream;
    selecting a data boundary from a plurality of boundary selection candidates in response to a boundary selection signal and producing a reconstructed n-bit data stream based on said data boundary;
    performing an n-bit write operation to store said reconstructed n-bit data stream into a register and performing an m-bit read operation to retrieve said m-bit data stream from said register, a ratio of a rate of said write operation to that of said read operation being m:n; and
    detecting whether or not said m-bit data stream conforms to a predetermined format and accordingly producing said boundary selection signal.

* * * * *